US005817202A

United States Patent [19]

Seidner

[11] Patent Number: 5,817,202

[45] Date of Patent: Oct. 6, 1998

[54] COMPOSITE MOULDING AND METHOD OF MAKING

[76] Inventor: Marc A. Seidner, 234 Conway Ave., Los Angeles, Calif. 90024

[21] Appl. No.: 837,768

[22] Filed: Apr. 22, 1997

[51] Int. Cl.[6] .............................. B32B 31/00; B27M 3/00

[52] U.S. Cl. .......................... 156/154; 156/211; 156/219; 156/221; 156/268; 156/304.1; 144/330; 144/332; 144/359; 144/360; 144/371; 264/139; 264/152; 264/DIG. 66

[58] Field of Search .............................. 428/50, 156, 172, 428/192; 156/60, 154, 211, 219, 221, 268, 304.1; 144/330, 331, 332, 359, 360, 371; 264/139, 152, 162, 167, DIG. 66

[56] References Cited

U.S. PATENT DOCUMENTS

| | | | |
|---|---|---|---|
| 3,476,630 | 11/1969 | Viol et al. | 156/268 |
| 4,061,809 | 12/1977 | Mautner | 428/50 |
| 4,619,800 | 10/1986 | Santo | 264/139 |
| 4,704,834 | 11/1987 | Turner | 428/50 |
| 5,665,190 | 9/1997 | Sanz | 156/154 |

*Primary Examiner*—Donald Loney
*Attorney, Agent, or Firm*—Pretty, Schroeder & Poplawski

[57] ABSTRACT

A method of making composite strips of millwork components, including the steps of providing a plurality of elongate strips of wood and a support sheet, adhering the strips of wood together in parallel with each other and to the support sheet to form an elongate composite sheet, and machining the composite sheet to a desired contour to form a molding strip. The method may also include the step of removing the support sheet after the machining step by machine, or by peeling, or otherwise as desired. Typically the strips of wood are of differing widths and heights. A composite molding strip is also disclosed.

12 Claims, 2 Drawing Sheets

FIG. 1a PRIOR ART
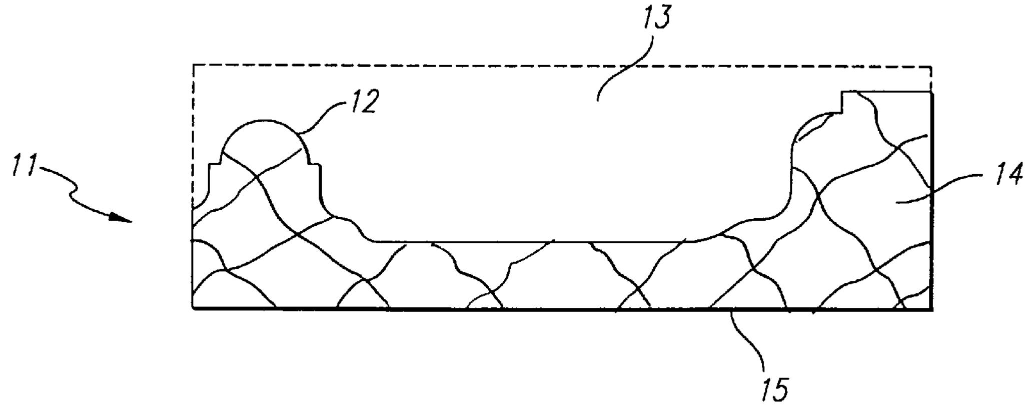
FIG. 1b
PRIOR ART
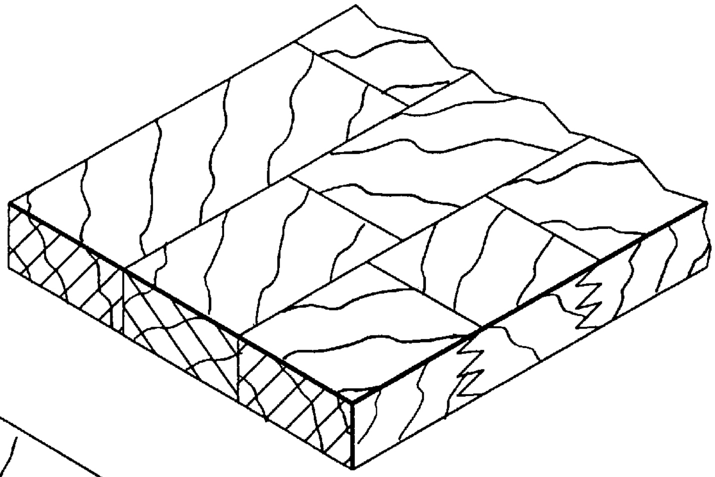
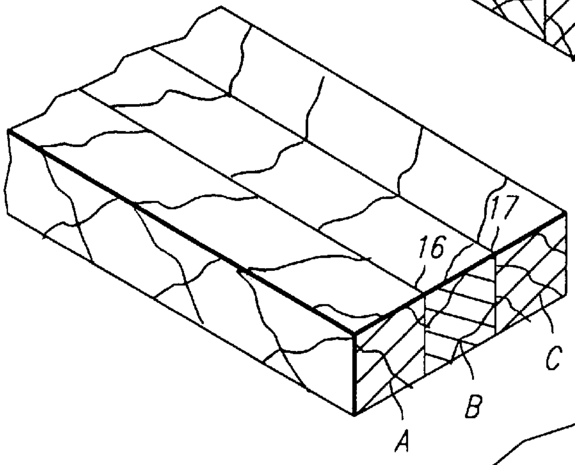
FIG. 1c
PRIOR ART
FIG. 1d
PRIOR ART
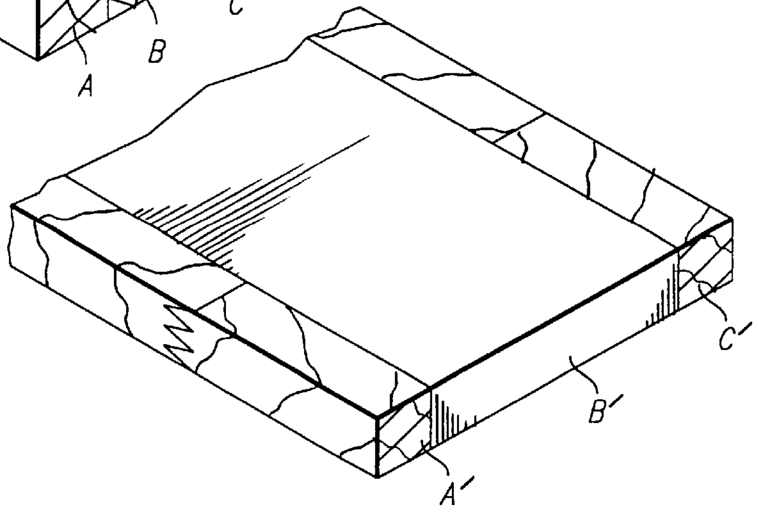

COMPOSITE MOULDING AND METHOD OF MAKING

BACKGROUND OF THE INVENTION

This invention relates to composite strips used as blanks for mouldings, frames and the like, and to a method of making such composite strips. Wood strips are widely used for mouldings, jambs, frames, ceiling trim, architecturally decorative paneling, window parts, drawer fronts, panels, door and cabinet parts, siding, and other structural and decorative products. All of these materials are sometimes referred to as millwork components. Often the contoured face of the strip will have a clear finish so that the nature of the wood used in producing the moulding is visible. In these products, the quality of the wood used in making the strip is important, and such wood is relatively expensive. Alternatively, mouldings may be paint grade where finished appearance and utility are primary considerations. When the moulding is a complex shape of varying cross section dimensions and is machined from a single piece of wood, or a rectangular blank of finger jointed and edge glued wood, a considerable amount of the wood is lost, especially when deep contour mouldings are utilized. One such moulding is illustrated in FIG. 1*a,* with the finished moulding shown in solid lines and with the waste material shown by the dash lines. With present day high production machining operations, the cost of the quality wood, whether solid or jointed, is a significant portion of the overall cost of the finished product. Accordingly, it is an object of the present invention to provide a new and improved composite moulding strip and method of making such a moulding which will significantly reduce the cost of the moulding strip.

Conventional solid wood strips are the product of wood cut from square faced planed or rough boards or planks by a ripping or longitudinal sawing operation. The resultant strips usually contain a multitude of defects formed in the boards or planks that require further cutting, ripping or defecting in order to develop a square edged sound strip of desired dimension and size.

Finger joint blanks are the product of several stages of ripping, cutting and squaring by re-ripping, if necessary to remove wane bark edges or splits, finger joint tenoning, gluing pressing end to end, trimming and re-ripping a straight edge. See FIG. 1*b.*

Edge glued blanks or strips are the product of gluing consecutive elongate solid wood or finger joint strips into successive longitudinally adhered strips. The edge glued strip itself is a larger square edged cross sectional dimension than the series of mechanical strips from which it is composed. See FIG. 1*c,* with fingers A, B and C edge glued at 16 and 17.

Prior established methods of strip fabrication performed with prior technology produces an expensive largely cost prohibitive raw material strip which still requires singular lineal fabrication in a moulder to produce a moulding or frame.

If composite wood panels are used in a moulding strip where the finished wood product is seen, the composite panel strip needs to be edge banded, that is a central strip B' with edge bands A', C' as seen in FIG. 1*d.* This is accomplished singularly, one edge at a time in a prior art edge glue machine to encase the composite panel strip. These machines require an edge banded strip to be essentially of the same thickness as the material being edge banded. Consequently, the remnant strip will only be able to develop a product of larger cross dimensional measure.

In any event, machining a deep profiled contour into the face of the strip causes a great deal of material waste, whether it is made of solid wood, finger joint wood, edge glued square edged strips or composite-wood and edge banded strips.

Because prior art moulding strips are made from squared edge large cross sectional dimensions blanks with square or rectangular ends larger amounts of wood are consumed producing sawdust and shavings waste without alternative in deep contoured profiling.

The dimensional stability of the blank and its suitability to further fabrication into a deep contoured moulding or millwork component depends largely on the strength and size of its glue band edges prior to lineal machining or moulding. Therefore significantly larger cross sectional dimensions and cubic volume and corresponding weight are fed into a moulder even when a smaller end product is desired. The unit value of the wood material wasted costs the same as the unit value of wood material saved and produced by the milling process.

It is a further object of this invention to reduce the cubic volume and weight of the unfed raw material. It is also an object of the present invention to produce a material of sufficient stability and suitability for moulding without the bulk volume hitherto required for such purposes and to do so by using lower cost composite wood or support sheet panels in the strip construction.

Prior art edge gluing requires that an even pressure be applied across the full thickness of the edge of the strip being glued. Successive strips of varying thickness will buckle and not remain flat, edge to edge, breaking the joint. Also conventional edge damping devices, automated or not, do not permit cost effective adhering of edges of thick and thin strips for the same reason. Pressure applied to the edges will cause the strip to buckle across its face during the gluing process if any shock or sharp movement occurs.

Other objects, advantages, features and results will more fully appear in the course of the following description.

SUMMARY OF THE INVENTION

The presently preferred embodiment of the method of the invention includes the steps of providing a plurality of elongate strips of wood and a support sheet, adhering the strips of wood together in parallel with each other and to the support sheet to form an elongate composite sheet, and machining the composite sheet to a desired contour to form a moulding strip. Other suitable millwork component materials, as defined herein, may be substituted for the strips of wood. The method may also include the use of an expendable material for the support sheet.

The method may also include the step of removing the support sheet, before or after the machining step, as by machining or peeling.

The elongate strips may be of differing widths and heights and configured to a shape which will accommodate the desired ultimate deep contoured profile with a minimum of waste.

The invention also includes a composite moulding strip having a plurality of elongate strips adhered together in parallel with each other to form an elongate composite strip, allowing for a machined contour along one face of the elongate strip. The strip may also include a removable support sheet along the opposite face of the elongate composite strip, which removable support sheet may be a peelable and/or a sandable sheet.

The invention allows for an ease of assembly of composite strips because it is faster and easier to arrange and glue strips edge to edge when the primary pressure being applied to the edges can also be applied to the strip faces, pressing the backs of the strips onto a support sheet.

BRIEF DESCRIPTION OF THE DRAWINGS

FIG. 1*a* is an end view of a strip of moulding showing the prior form of producing such a strip;

FIG. 1*b* is a perspective view illustrating prior art finger joint tenoning;

FIG. 1*c* is a perspective view illustrating prior art edge gluing;

FIG. 1*d* is a view similar to that of FIG. 1*c* illustrating another form of edge gluing;

DESCRIPTION OF THE PREFERRED EMBODIMENTS

Figure 2:
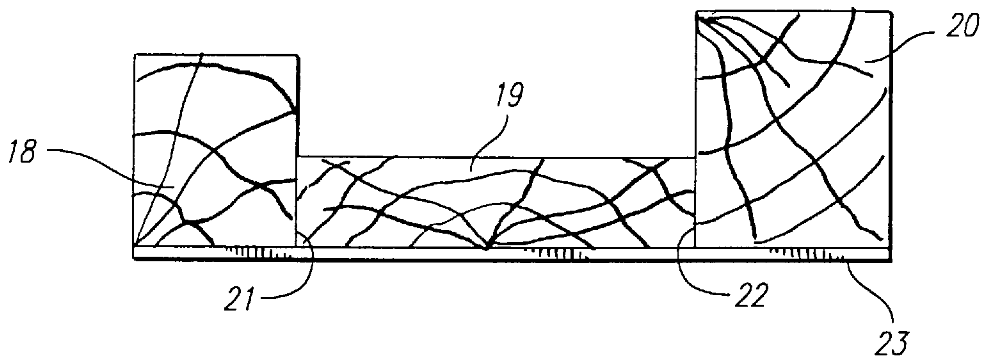
FIG. 2 is a similar view of a step in the production of the composite moulding strip of the present invention, utilizing three elongate strips of wood of different widths and different heights, with a support sheet.

The prior art moulding shown in FIG. 1 was originally a strip 11 of wood of rectangular cross section. In the machining step, the contour 12 was cut into the strip, with the material in the dash line section 13 removed, leaving the finished moulding strip 14 with the desired contour on one face. The opposite face 15 may be left flat or may be machined as desired.

In the assembly illustrated in FIG. 2, elongate strips 18, 19, 20 are adhered together at their abutting faces 21, 22, typically using a conventional adhesive. The strips may be of wood or other material suitable for machining to the desired contour. Hard woods, soft woods, various composites of wood and other materials, plastic, stone, and the like may be used.

Also, the strips 18, 19, 20 are adhered to an elongate support sheet 23. The support sheet may be of wood, plastic, aluminum, or other material as desired. It may be expendable or retrievable composite panel wood fibre, machineable or not, but it should provide rigidity and tangential strength plus offer a bondable surface to which the strips may be readily adhered.

The adhesive material bonding the edge strips to each other need not be the same adhesive used for bonding the strips to the support sheet. For example, the elongate strips may be edge glued to each other by a white PVA (polyvinyl acetate) or epoxy having durable exterior properties which gain in strength and cure over the passage of time, hours, or days or longer.

The strips may be banded to the support panel by an adhesive which is less durable, quicker curing or more easily removed. Such an adhesive could be a quick setting hot melt adhesive that bonds the strips in minutes or less to a support panel, such as an aluminum panel. During the curing process of the white PVA or epoxy, the whole product is held together by the hot melt to the panel. After the machining process for moulding, or prior to it if desired, the strips can be removed from the aluminum support sheet by heating the metal, with the heat transferring to the hot melt and loosening it. Excess hot melt remaining on the strips cools quickly and is machined away. The aluminum sheet may be recycled. The composite strip may be stored and/or shipped with the support attached, and at a later date, the support sheet may be removed.

In the next step of making the composite strip of moulding, the composite sheet of FIG. 2 is machined to the contour 12, producing the composite strip 29. With this operation, the wood waste is only that shown by the dash line sections 26, 27, 28. This results in a considerable saving of wood, especially when a moulding strip with a variety of high surfaces and deeply contoured lower surfaces is being produced.

Figure 3:
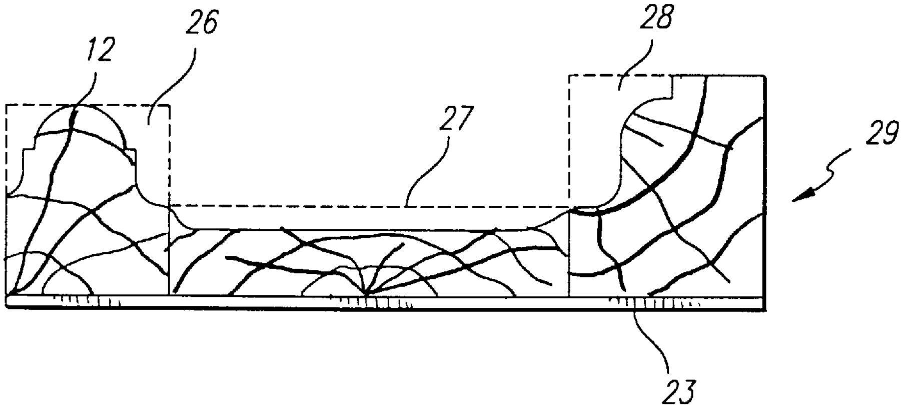
FIG. 3 is a view similar to that of FIG. 2 following the machining step which produces the desired contour on one face of the moulding strip.
Figure 4:
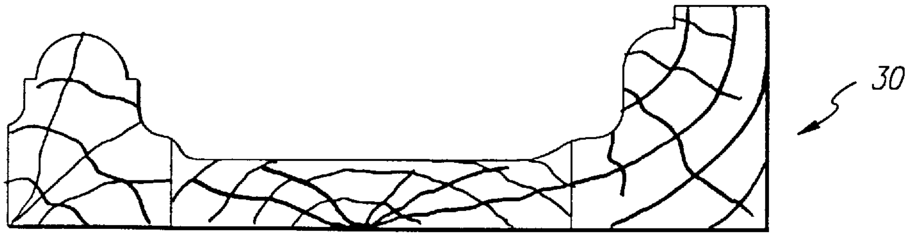
FIG. 4 is a view similar to that of FIG. 3 showing the moulding strip after the support sheet has been removed.

If desired, the support sheet 23 may now be removed from the composite strip 29, to produce the composite strip 30 as shown in FIG. 4. Alternatively, the support sheet may be removed prior to the machining step. If a peelable material is used for the support sheet 23, it is simply peeled away. If wood or some other form of material is used, the support sheet may be removed by machining, such as by milling or by sanding. The composite moulding strip as shown in FIG. 3 or in FIG. 4 is now ready for use in the same manner as was the prior art moulding strip 14 of FIG. 1.

While the specific embodiments illustrated show three elongate strips of wood 18, 19, 20, of differing widths and differing heights, the number of elongate strips utilized and the shapes of the individual strips will depend on the desired profile of the finished product.

The pressing of the strips onto a support sheet may be accomplished by a membrane press or vacuum press. Each of these conforms to the regular heights of the varying strips while applying even pressure downwards to the support sheet and edge to edge during the gluing process. This allows a collection of irregular height surfaced strips to be bonded to each other and the support panel at the same time.

Singular composite strips may be composed and glued onto singular support sheets of the same width. Alternatively, a series of composite strips may be composed on a larger wider panel serving as a support sheet and facilitating the gluing of an entire wide composite panel at one time.

I claim:

1. A method of making a deeply contoured elongated moulding comprising:

providing a plurality of elongated machinable strips of wood, plastic or stone, each strip being of rectangular cross-section and the various strips being of differing widths and heights selected in accordance with the profile of the desired moulding strip;

providing an elongated support sheet having a bondable surface;

positioning the strips along side each other in a parallel fashion on the bondable surface so that the edges of the strips abut each other and together form a profile corresponding to and enclosing the deep contour of the moulding;

adhering abutting surfaces of the moulding strips to each other with a first adhesive;

adhering the strips to the bonding surface with a second adhesive; and then machining the strips on surfaces thereof that do not abut the bonding surfaces to remove material and produce the profile of the deeply contoured elongated moulding; and removing the support sheet from the moulded strips.

2. The method of claim 1, wherein the first adhesive is more durable than the second adhesive.

3. The method of claim 2, wherein the second adhesive is a hot melt adhesive, the first adhesive is not a hot melt adhesive, and the step of removing the support sheet includes heating the support sheet to soften the hot melt adhesive.

4. The method of claim 1, wherein the first adhesive is a white PVA.

5. The method of claim 1, wherein the first adhesive is an epoxy.

6. The method of claim 1, wherein the first adhesive is a white PVA, the second adhesive is a hot melt adhesive, and the step of removing the support sheet includes heating the support sheet to soften the hot melt adhesive.

7. The method of claim 1, wherein the first adhesive is an epoxy, the second adhesive is a hot melt adhesive, and the step of removing the support sheet includes heating the support sheet to soften the hot melt adhesive.

8. The method of claim 1, wherein the support sheet is aluminum.

9. The method of claim 1, wherein the support sheet is aluminum, the second adhesive is a hot melt adhesive and the step of removing the support sheet includes heating the support sheet to soften the hot melt adhesive.

10. The method of claim 1, wherein the support sheet is removed before the wood strips are machined to produce the profile of the deeply contoured millwork strip.

11. The method of claim 1, wherein some but not all of the wood strips are formed of a composite wood material.

12. The method of claim 1, wherein the support strip is removed by machining.

* * * * *